US012779734B2

(12) United States Patent
Kaneshiro

(10) Patent No.: US 12,779,734 B2
(45) Date of Patent: Nov. 3, 2026

(54) DICING DEVICE

(71) Applicant: Tokyo Seimitsu Co., Ltd., Tokyo (JP)

(72) Inventor: Yusuke Kaneshiro, Tokyo (JP)

(73) Assignee: TOKYO SEIMITSU CO., LTD., Tokyo (JP)

( * ) Notice: Subject to any disclaimer, the term of this patent is extended or adjusted under 35 U.S.C. 154(b) by 0 days.

(21) Appl. No.: 18/900,013

(22) Filed: Sep. 27, 2024

(65) Prior Publication Data

US 2025/0018605 A1 Jan. 16, 2025

Related U.S. Application Data

(63) Continuation of application No. PCT/JP2023/010554, filed on Mar. 17, 2023.

(30) Foreign Application Priority Data

Mar. 30, 2022 (JP) ................................ 2022-056678

(51) Int. Cl.
*B28D 5/02* (2006.01)

(52) U.S. Cl.
CPC .................................. *B28D 5/029* (2013.01)

(58) Field of Classification Search
CPC ................................. B28D 5/029; B28D 5/02
See application file for complete search history.

(56) References Cited

U.S. PATENT DOCUMENTS

| | | | | |
|---|---|---|---|---|
| 11,060,955 B2 * | 7/2021 | Spomer | .................... | G01N 1/06 |
| 2002/0104422 A1 * | 8/2002 | Negishi | ............... | H10P 72/0428 83/401 |
| 2002/0179079 A1 * | 12/2002 | Sekiya | ................ | H10P 72/0428 125/13.01 |
| 2003/0056628 A1 * | 3/2003 | Razon | ....................... | B27B 5/34 83/425.2 |

(Continued)

FOREIGN PATENT DOCUMENTS

| | | |
|---|---|---|
| JP | 2010-272842 A | 12/2010 |
| JP | 2012-222232 A | 11/2012 |

(Continued)

OTHER PUBLICATIONS

English translation of the International Search Report (Form PCT/ISA/210) for International Application No. PCT/JP2023/010554, dated May 30, 2023.

(Continued)

*Primary Examiner* — Omar Flores Sanchez
(74) *Attorney, Agent, or Firm* — Birch, Stewart, Kolasch & Birch, LLP

(57) ABSTRACT

Provided is a dicing device capable of favorably performing a maintenance work, even when a workpiece is large. A dicing device includes a housing that accommodates inside thereof, a worktable configured to hold and move a workpiece, and a spindle configured to be rotatable while holding a blade, wherein the housing has: an end face provided in a moving direction of the worktable, the end face being on a side where a maintenance work of the dicing device is (Continued)

performed; and a slider constituting a part of the end face, and the slider is configured to be freely slidable in a direction to shorten a distance from the end face to the spindle.

3 Claims, 7 Drawing Sheets

(56) References Cited

U.S. PATENT DOCUMENTS

| | | | | |
|---|---|---|---|---|
| 2003/0089206 | A1* | 5/2003 | Ueno | B28D 5/0088 83/34 |
| 2004/0011176 | A1* | 1/2004 | Sekiya | B28D 5/029 83/425.3 |
| 2005/0136801 | A1* | 6/2005 | Sekiya | B28D 5/029 451/5 |
| 2010/0077897 | A1* | 4/2010 | Gurley | B28D 5/024 83/451 |
| 2011/0054657 | A1* | 3/2011 | Tsushima | B28D 5/029 700/101 |

FOREIGN PATENT DOCUMENTS

| | | | |
|---|---|---|---|
| JP | 2013-120794 | A | 6/2013 |
| JP | 2013-254834 | A | 12/2013 |
| TW | 201044450 | A1 | 12/2010 |

OTHER PUBLICATIONS

International Preliminary Report on Patentability and English translation of the Written Opinion of the International Searching Authority (Forms PCT/IB/373 and PCT/ISA/237) for International Application No. PCT/JP2023/010554, dated Sep. 24, 2024.
Japanese Office Action for Japanese Application No. 2022-056678, dated Dec. 16, 2025, with English translation.
Korean Office Action for counterpart Korean Application No. 10-2024-7032100, dated Jun. 4, 2026, with English translation.
Taiwanese Office Action and Search Report for counterpart Taiwanese Application No. 112111936, dated Jul. 29, 2026, with English translation.

* cited by examiner

DICING DEVICE

CROSS-REFERENCE TO RELATED APPLICATIONS

The present application is a Continuation of PCT International Application No. PCT/JP2023/010554 filed on Mar. 17, 2023 claiming priority under 35 U.S.C. § 119(a) to Japanese Patent Application No. 2022-056678 filed on Mar. 30, 2022. Each of the above applications is hereby expressly incorporated by reference, in its entirety, into the present application.

BACKGROUND OF THE INVENTION

Field of the Invention

The present invention relates to a dicing device, and particularly to a dicing device that performs groove processing and cutting processing on a workpiece such as a wafer on which semiconductor devices and electronic components are formed.

Description of the Related Art

In a dicing device that performs groove processing and cutting processing on a workpiece such as a wafer on which semiconductor devices, electronic components and the like are formed, the dicing device processes the workpiece placed on a worktable with a blade rotating at a high speed while applying a grinding fluid or a cleaning solution.

The dicing device includes a worktable on which the workpiece is placed, a blade that cuts the workpiece, a worktable feeding mechanism that moves the worktable relative to the blade, a spindle to which the blade is rotatably attached, a spindle moving mechanism movably supporting the spindle, and imaging means (an alignment camera) for observing an upper surface of the workpiece (see, for example, Patent Literature 1).

The dicing device described in Patent Literature 1 includes a square housing formed in a square shape in plan view. In this dicing device, the worktable feeding mechanism is installed on one diagonal line of the square housing, and the spindle moving mechanism is installed on the other diagonal line of the square housing. That is, the worktable feeding mechanism and the spindle moving mechanism are arranged perpendicularly to each other. Then, a substantially middle part of the square housing, that is, a part of the square housing in which the worktable feeding mechanism crosses the spindle moving mechanism at right angles is a part where the workpiece is processed.

Furthermore, the dicing device described in Patent Literature 1 has an oblique line edge part formed by obliquely cutting out a corner part of the square housing. The oblique line edge part of the square housing is a part corresponding to a stroke end of the worktable feeding mechanism and is configured such that workpiece replacement and maintenance work may be performed from an opening provided in the oblique line edge part. That is, in this dicing device, the cutout part of the square housing is a work area (hereinafter referred to as a "maintenance area") for performing the workpiece replacement and maintenance work.

CITATION LIST

Patent Literature

Patent Literature 1: Japanese Patent Application Laid-Open No. 2013-120794

SUMMARY OF THE INVENTION

When a maintenance area is disposed at a stroke end of a worktable feeding mechanism as in the dicing device described in Patent Literature 1 described above, a blade attached to a spindle is disposed at a position away from the maintenance area in consideration of safety.

In such a dicing device, it is necessary to design a longer stroke of the worktable feeding mechanism (movable range of the worktable) for performing processing while moving a workpiece placed on the worktable relative to the blade and imaging means. In particular, in recent years, with increase in size of the workpiece, the worktable has also increased in size, and the stroke of the worktable feeding mechanism accordingly tends to become longer.

However, when a distance from the maintenance area to the blade increases as the worktable feeding mechanism increases the stroke, there is a problem that accessibility to the blade becomes worse in a maintenance work and that efficiency of a blade replacement work decreases.

In view of such circumstances, the present invention aims to provide a dicing device having improved accessibility to a blade during the maintenance work.

To achieve the object of the present invention, a dicing device according to a first aspect of the present invention includes a housing configured to accommodate inside thereof, a worktable configured to hold and move a workpiece, and a spindle configured to be rotatable while holding a blade, wherein the housing includes: an end face provided in a moving direction of the worktable, the end face being on a side where a maintenance work of the dicing device is performed; and a slider constituting a part of the end face, and the slider is configured to be freely slidable in a direction to shorten a distance from the end face to the spindle.

According to a second aspect of the present invention, in the dicing device of the first aspect of the present invention, the slider is located at a protruding position during dicing processing and is located at a retracted position that is a position closer to the blade than the protruding position during the maintenance work.

According to a third aspect of the present invention, the dicing device according to the second aspect of the present invention includes a fixture configured to removably fix the slider at the protruding position.

According to the present invention, it is possible to improve accessibility to a blade during a maintenance work.

DESCRIPTION OF THE EMBODIMENTS

Hereinafter, a preferable embodiment of the present invention will be described with reference to the accompanying drawings. In the following drawings, an X-axis direction, a Y-axis direction, and a Z-axis direction are mutually perpendicular directions, the X-axis direction is a horizontal direction, the Y-axis direction is a horizontal direction perpendicular to the X-axis direction, the Z-axis direction is a vertical direction (perpendicular direction), and a θ-direction is a rotating direction about the Z-axis direction.

Figure 1:
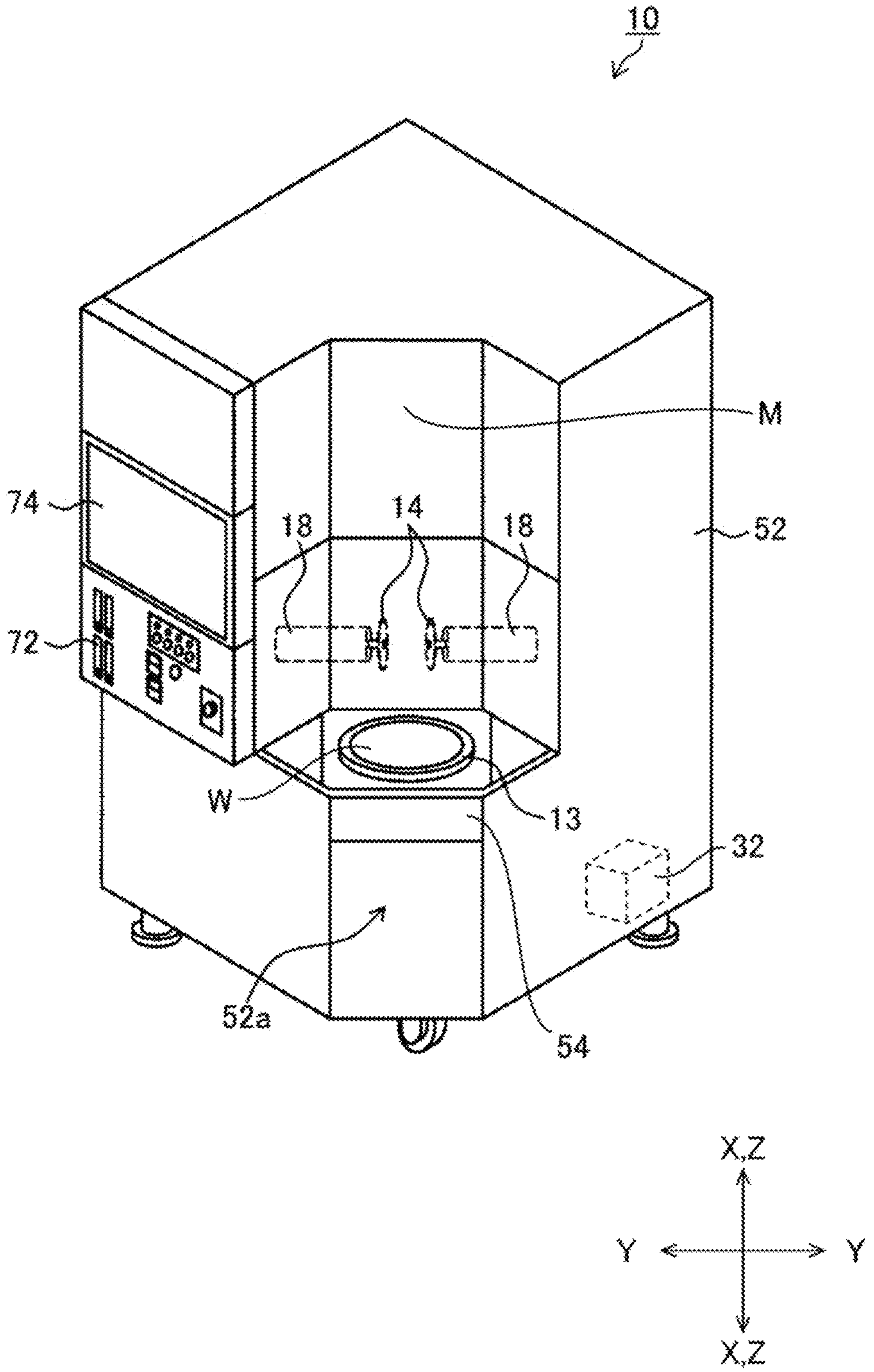
FIG. 1 is a perspective view showing an example of appearance of a dicing device.

FIG. 1 is a perspective view showing an example of appearance of the dicing device 10. As shown in FIG. 1, a housing 52, which is a main body part of a dicing device 10, is formed in a rectangular parallelepiped shape. In other words, the housing 52 is formed into a square shape in plan view (when viewed from above in FIG. 1). The housing 52 accommodates a worktable 12, spindles 18, blades 14 and others in an interior of the housing. On an outer surface of the housing 52, an operation unit 72, a monitor 74 and others for performing various operations are provided.

Figure 2:
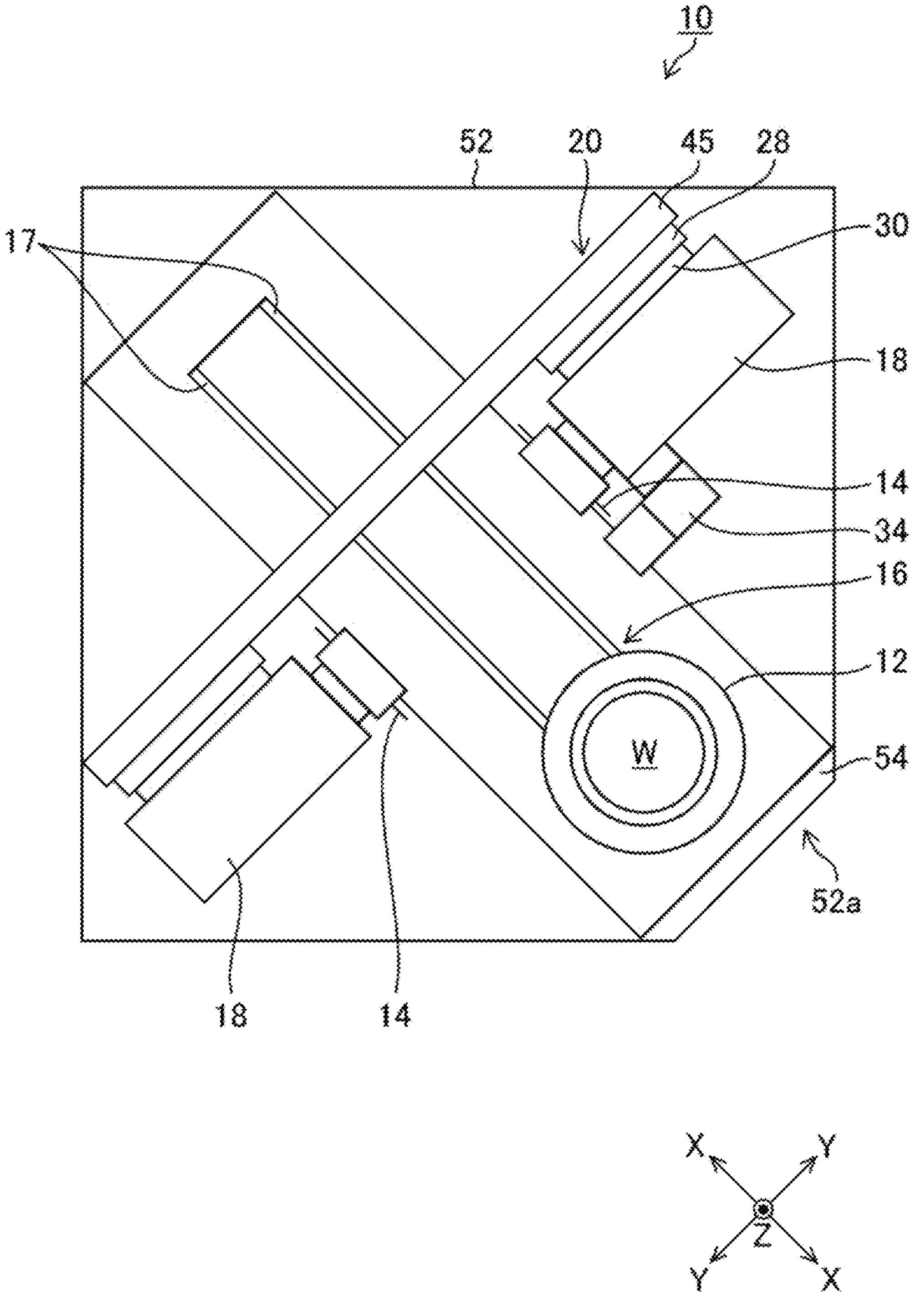
FIG. 2 is a plan view showing an example of an internal layout of the dicing device shown in FIG. 1.
Figure 3:
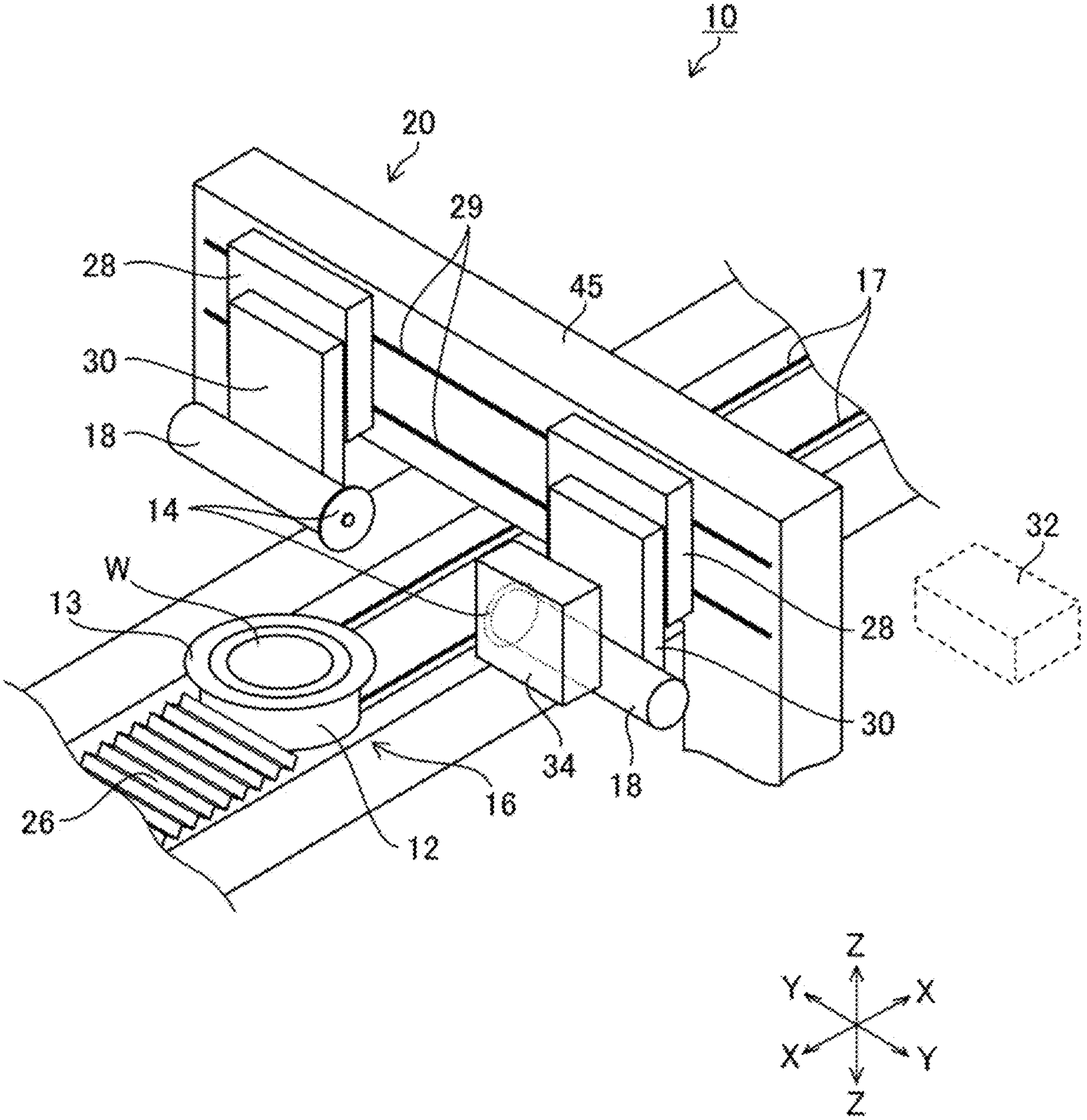
FIG. 3 is a perspective view showing an example of the internal layout of the dicing device shown in FIG. 1.

FIGS. 2 and 3 are a plan view and perspective view showing an example of an internal layout of the dicing device 10 shown in FIG. 1. As shown in FIGS. 2 and 3, the dicing device 10 includes the worktable 12, a pair of blades 14, a worktable feeding mechanism 16, a pair of spindles 18, a spindle moving mechanism 20, and a controller 32 (see FIG. 3).

The worktable 12 is parallel to a horizontal direction (XY-direction) and includes an unshown suction device. A substantially disk-shaped workpiece W is held on the worktable 12 so that the center of the workpiece W is almost coincident with the center of the worktable 12, in a state where the workpiece W is fixed to a substantially annular frame 13 with a dicing processing tape (not shown) interposed between the workpiece and the frame.

The pair of blades 14 are arranged opposing each other, to cut the workpiece W that is on the worktable 12.

The worktable feeding mechanism 16 includes a ball screw (not shown), a motor (not shown) and a pair of X-axis guide rails 17. The X-axis guide rails 17 are guide members that are provided below the worktable 12 and guide movement of the worktable 12 along the X-axis direction. The worktable feeding mechanism 16 moves the worktable 12 (workpiece W) on the X-axis guide rails 17, to move the worktable 12 relative to the blades 14 in the X-axis direction (grind feeding). Furthermore, the worktable feeding mechanism 16 may rotate the worktable 12 in the θ-direction with an unshown mechanism.

Furthermore, if necessary, a retractable waterproof cover 26 (see FIG. 3) is provided below the worktable 12 for preventing a grinding fluid or a cleaning solution from entering the worktable feeding mechanism 16.

The pair of spindles 18 incorporate high-frequency motors and rotatably hold the blades 14. The spindle moving mechanism 20 movably supports the spindles 18. The spindle moving mechanism 20 includes a ball screw (not shown), a motor (not shown), a gate-shaped guide base (Y-base) 45, a pair of Y-axis guide rails 29, and a pair of Y-axis tables 28. The Y-axis guide rails 29 are guide members that are provided on a side surface of the guide base 45 and guide the Y-axis tables 28 along the Y-axis direction. The spindle moving mechanism 20 moves the Y-axis tables 28 on the Y-axis guide rails 29, to move the blades 14 relative to the worktable 12 in the Y-axis direction (index feeding).

Each Y-axis table 28 is provided with a Z-axis table 30 driven in the Z-axis direction by a guide mechanism and a drive mechanism that are not shown. Then, each spindle 18 is fixed to the Z-axis table 30, and the blade 14 is attached to a tip each spindle 18. The spindle moving mechanism 20 moves the Z-axis table 30 along an unshown guide mechanism, to move the blade 14 relative to the worktable 12 in the Z-axis direction (cut depth feeding).

Furthermore, imaging means (an alignment camera) 34 for observing an upper surface of the workpiece W is attached to the Z-axis table 30. The imaging means 34 includes an unshown imaging element. Examples of the imaging element include a charged coupled device (CCD), a complementary metal oxide semiconductor (CMOS), and the like. Note that the imaging element is not limited to this example. Any type of imaging element may be appropriately selected and used depending on the type of illumination light, the type of workpiece W, an observation site, and the like.

The imaging means 34 captures an image of the workpiece W that is on the worktable 12 and transmits the captured image of the workpiece W to a controller 32. The controller 32 uses the image of the workpiece W for alignment.

The controller 32 controls an operation of each part of the dicing device 10. The controller 32 includes an arithmetic device (computation device) such as a personal computer, for example, and examples of various processors include a central processing unit (CPU), a graphics processing unit (GPU), an application specific integrated circuit (ASIC), and a programmable logic device. Also, examples of the programmable logic device include a simple programmable logic device (SPLD), a complex programmable logic device (CPLD), and a field programmable gate array (FPGA). Furthermore, various functions of the controller 32 may be achieved by one processor or may be achieved by processors of the same type or diverse types.

As shown in FIGS. 1 and 2, the housing 52 has an end face (chamfered surface) **52*a* formed by obliquely cutting one corner part of four corner parts (the corner part on a front side in FIG. 1, a lower right corner part in FIG. 2). An upper space above the formed end face 52*a* of the housing 52 is a maintenance space M for performing workpiece replacement and maintenance work (see FIG. 1). The maintenance space M is open to outside. An opening (not shown) that communicates between the maintenance space M and an internal space of the housing 52 is provided with an opening and closing member (not shown) such as an opening and closing cover. As a result, during processing by the dicing device 10, the opening is closed with the opening and closing member, so that the internal space of the housing 52 is closed off from the maintenance space M. In contrast, when performing the workpiece replacement or maintenance work, the opening is opened with the opening and closing member, to allow access to the internal space of the housing 52** from the maintenance space M through the opening, enabling a worker (user) to perform the workpiece replacement or maintenance work.

A position opposing the end face **52*a* of the housing 52 serves as a work area (maintenance area) where the worker stands when performing the workpiece replacement or maintenance work. The dicing device 10 in the present embodiment includes a slider 54** constituting a part of the end face 52*a* of the housing 52 on a maintenance area side, as will be described later in detail. The slider 54 is a member constituting an outermost surface (the surface at a position farthest from the blades 14) in the X-axis direction (moving direction of the worktable 12) in the end face 52*a* of the housing 52. The slider 54 is a movable member configured to slide freely in the X-axis direction. A position of the slider in the X-axis direction may be changed between when dicing processing and when the maintenance work. As a result, while acquiring a predetermined stroke of the worktable 12 during the dicing processing, the worker may stand at a position closer to the maintenance space M during the maintenance work than during the dicing processing so as to shorten an access distance to the blade 14, thereby improving efficiency of a replacement work of the blade 14.

Figure 4:
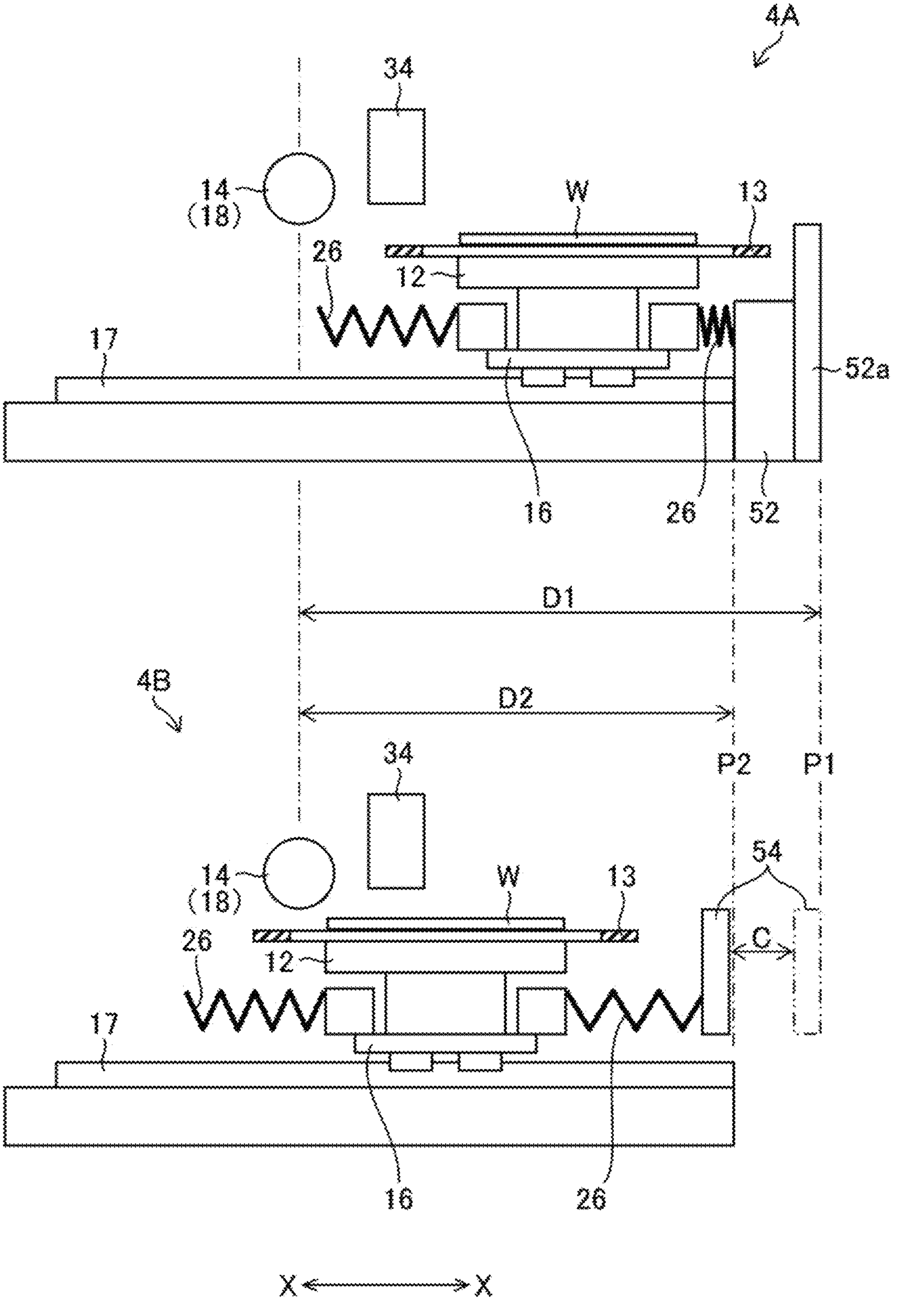
FIG. 4 is a view for explaining an access distance to a blade during a maintenance work.

FIG. 4 is a view for explaining the access distance to the blade 14 during the maintenance work. FIG. 4 shows a positional relationship of the worktable 12, the imaging means 34 and the blade 14 in the X-axis direction during the maintenance work. In FIG. 4, parts unrelated to the description are omitted. For facilitating understanding of the description, in FIG. 4, sign 4A designates a configuration according to a comparative example, and sign 4B designates a configuration according to the present embodiment.

In the comparative example designated by the sign 4A in FIG. 4, the slider 54 described above is not provided, and the end face 52*a* of the housing 52 is fixedly disposed (that is, the end face 52*a* is non-slidable in the X axis direction). In this case, for moving the workpiece W placed on the worktable 12 relative to the blade 14 and the imaging means 34 in the X-axis direction during the dicing processing, the stroke of the worktable feeding mechanism 16 (movable range of the worktable 12) requires a distance of at least twice or more times of a maximum width (outer diameter) of the workpiece W (including the frame 13 to which the workpiece W is fixed) held on the worktable 12. Therefore, it is necessary to design a position and size of the end face 52*a* of the housing 52 so that the end face does not interfere with the worktable 12 or the workpiece W (including the frame 13) moved to a stroke end of the worktable feeding mechanism 16. As a result, as designated by the sign 4A of FIG. 4, an access distance D1 from the end face 52*a* of the housing 52 to the blade 14 is a length determined in consideration of a moved position of the worktable 12 during the dicing processing.

In a configuration in which the end face 52*a* of the housing 52 is fixedly disposed as in the comparative example, when the stroke of the worktable feeding mechanism 16 increases as the workpiece W increases in size, the access distance D1 from the end face 52*a* of the housing 52 to the blade 14 accordingly increases. As a result, accessibility to the blade 14 during the maintenance work becomes worse, and the efficiency of the replacement work of the blade 14 decreases.

In contrast, as designated by the sign 4B in FIG. 4, in the present embodiment, the slider 54 constituting a part of the end face 52*a* of the housing 52 is provided in the end face 52*a* of the housing 52 on the maintenance area side. The slider 54 is a member constituting the outermost surface (the surface at a position farthest from the blade 14) in the X-axis direction (moving direction of the worktable 12) in the end face 52*a* of the housing 52. The slider 54 is configured to slide freely in the X-axis direction. That is, as designated by the sign 4B in FIG. 4, the slider 54 may slidingly move between a protruding position P1 and a retracted position P2. Then, during the dicing processing, the slider 54 is located at the protruding position P1. During the maintenance work, the worker manually operates the slider 54 to move the slider 54 from the protruding position P1 to the retracted position P2. Alternatively, the slider 54 may slidingly move between the protruding position P1 and the retracted position P2 by use of an electric drive mechanism.

According to the present embodiment, since the slider 54 is located at the protruding position P1 during the dicing processing, the worktable 12 is movable to the same position as in the above comparative example. That is, the stroke of the worktable feeding mechanism 16, which must be acquired during the dicing processing, is not impaired (not shortened).

Furthermore, in the present embodiment, during the maintenance work, it is not necessary to move the worktable 12 to the stroke end of the worktable feeding mechanism 16 in the dicing processing, and therefore the slider 54 is moved from the protruding position P1 to the retracted position P2 and the worktable 12 is stopped at a position (intermediate position) before the stroke end of the worktable feeding mechanism 16. As a result, an access distance D2 from the end face 52*a* of the housing 52 to the blade 14 during the maintenance work is shorter than the access distance D1 in the above comparative example (because the distance decreases by an amount of a slidable distance C of the slider 54), so that it is possible to improve accessibility to the blade 14 during the maintenance work and to improve the efficiency of the replacement work of the blade 14. The slidable distance C of the slider 54 is, as an example, from about 60 mm to 150 mm.

Furthermore, during the workpiece replacement, the slider 54 may be at either the protruding position P1 or the retracted position P2, as long as the slider does not interfere with the worktable 12 or workpiece W (including the frame 13) moved to a workpiece replacement position (lower position in the maintenance space M).

Thus, in the dicing device 10 according to the present embodiment, while acquiring the stroke of the worktable feeding mechanism 16 that is equivalent to the stroke in the above comparative example during the dicing processing, the accessibility to the blade 14 during the maintenance work is improved, and the blade 14 may therefore be replaced efficiently.

Furthermore, the dicing device 10 according to the present embodiment may be achieved by incorporating the slider 54 so that the slider slides freely in the X-axis direction (in the moving direction of the worktable 12) with respect to the housing 52 without changing the internal layout of the dicing device 10, and hence the dicing device may be achieved comparatively inexpensively.

Figure 5:
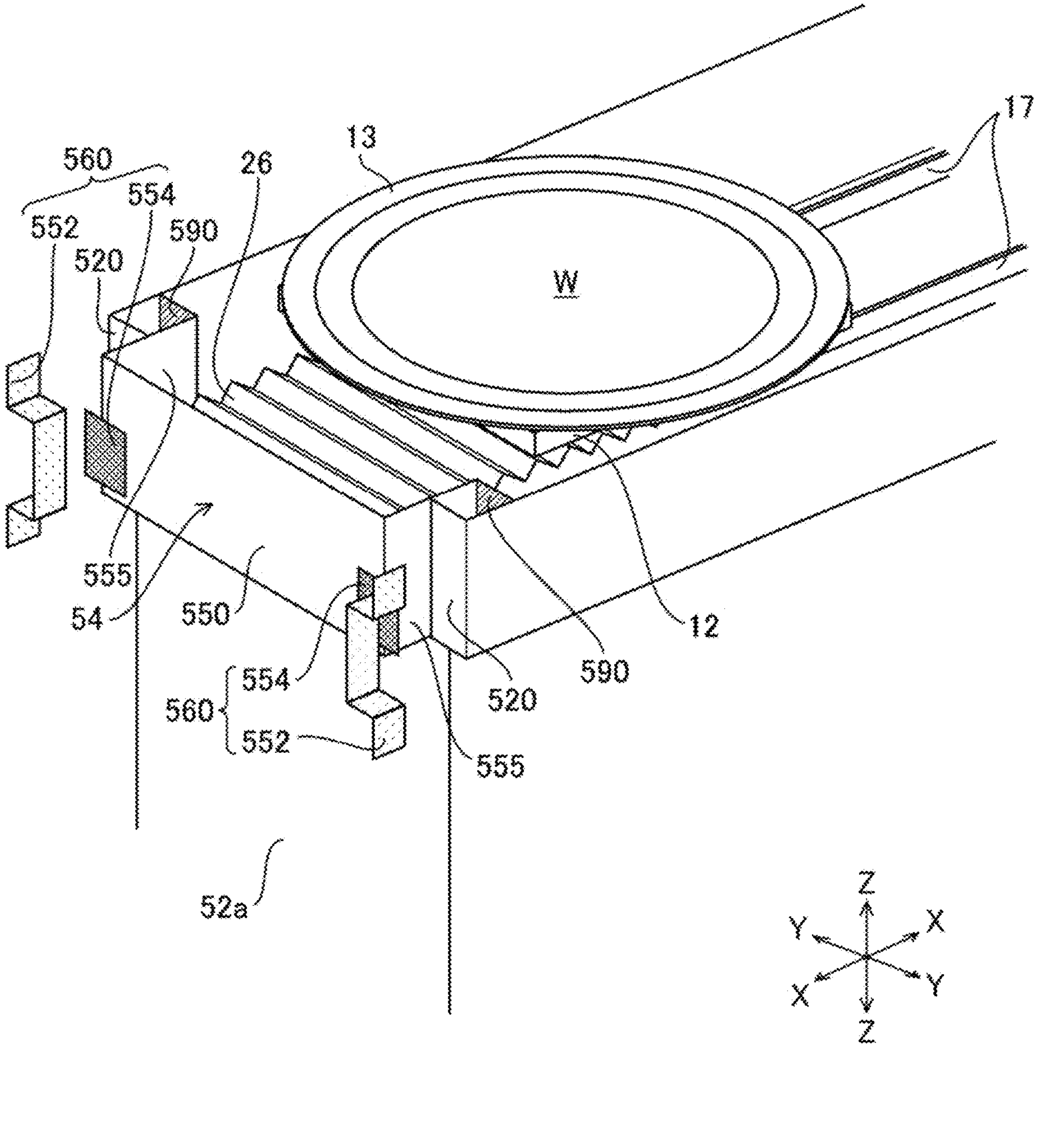
FIG. 5 is a front perspective view showing a configuration of a slider.

Hereinafter, the configuration of the slider 54 will be described in more detail with reference to FIGS. 5 and 6. FIG. 5 is a front perspective view in the vicinity of the slider 54, and FIG. 6 is a rear perspective view in the vicinity of the slider 54.

Figure 6:
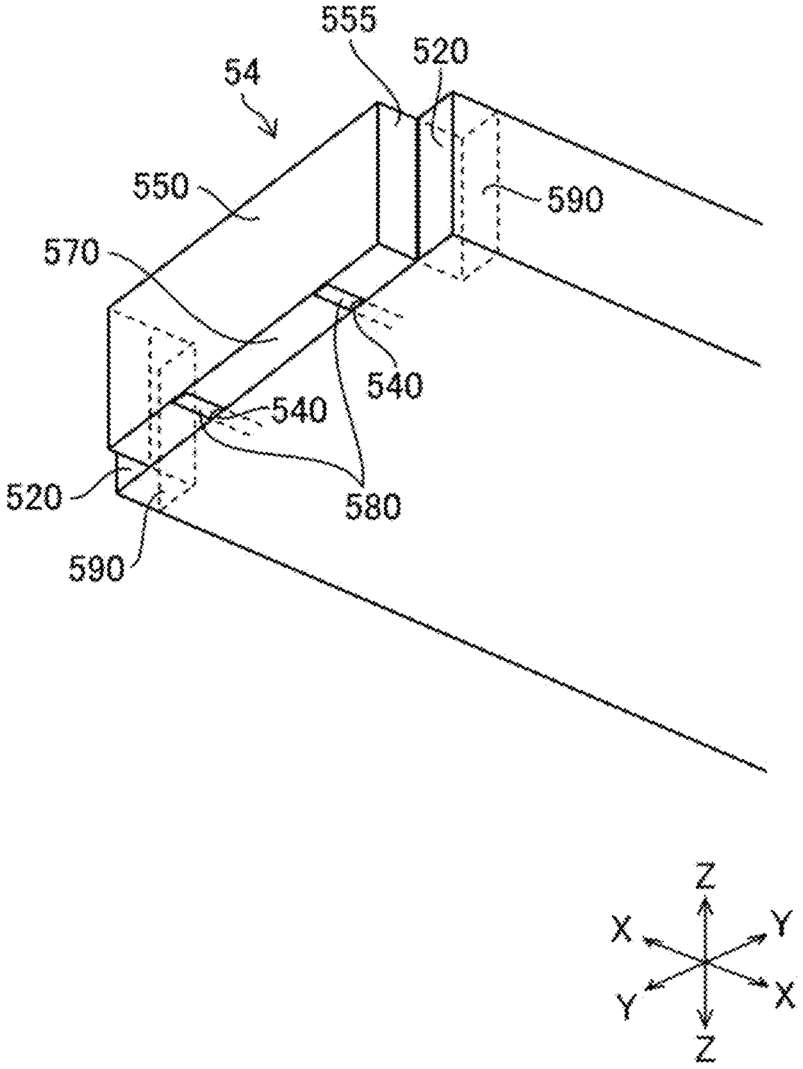
FIG. 6 is a rear perspective view showing the configuration of the slider.

As shown in FIGS. 5 and 6, the slider 54 formed by assembling metal plates. The slide 54 is inserted and disposed to be freely slidable in a slider placing opening (opening for placing the slider 54) provided on the end face 52*a* of the housing 52. The slider 54 includes a front plate part 550, side plate parts 555, a bottom plate part 570, and retaining plate parts 590.

The front plate part 550 has a flat plate shape perpendicular to the X-axis direction and constitutes a part of the end face 52*a* of the housing 52. The side plate parts 555 have a flat plate shape substantially parallel to an XZ-plane. The side plate parts 555 are coupled to opposite ends of the front plate part 550 in the Y-axis direction. The bottom plate part

570 has a flat plate shape substantially parallel to an XY-plane (horizontal direction) and is disposed in a bottom part of a region surrounded by the front plate part 550 and a pair of side plate parts 555.

On a back side of the bottom plate part 570 (lower surface in FIG. 5), provided are a pair of guide rails 580 that guide movement of the slider 54 in the X-axis direction. The pair of guide rails 580 are formed along the X-axis direction. The housing 52 includes a pair of guide rail blocks 540 that slidably engage with the guide rails 580. Consequently, the slider 54 is configured to slide freely in the X-axis direction. Therefore, as described above, the slider 54 slidably moves between the protruding position P1 and the retracted position P2. Note that the present configuration is not restrictive as long as the slider 54 may slide freely in the X-axis direction.

Each of the retaining plate parts 590 (shaded in FIG. 5) is a flange-like member disposed in a base end part opposite to the front plate part 550 in the slider 54. The retaining plate parts 590 have a flat plate shape perpendicular to the X-axis direction and are coupled to the side plate parts 555. The retaining plate parts 590 abut on stopper surfaces 520 provided in the housing 52 so that when the slider 54 slidingly moves from the retracted position P2 to the protruding position P1, the slider 54 is prevented from falling out from the slider placing opening of the housing 52. Each of the stopper surfaces 520 of the housing 52 is formed in a wall part that defines the slider placing opening of the housing 52. Note that the present configuration is not restrictive as long as the slider 54 may be prevented from falling out from the slider placing opening.

As shown in FIG. 5, the present embodiment includes fixtures 560 for removably fixing the slider 54 moved to the protruding position P1 during the dicing processing. Each of the fixtures 560 includes a fixing side member 552 and a fixed side member (side member to be fixed) 554. The fixing side member 552 is provided in the housing 52, and the fixed side member 554 is provided in the front plate part 550 of the slider 54. When the slider 54 moves to the protruding position P1 during the dicing processing, the fixing side member 552 and the fixed side member 554 that constitute the fixture 560 are engaged with each other, to inhibit the slider 54 from moving in the X-axis direction. That is, during the dicing processing, the slider 54 may be fixed at the protruding position P1. This may prevent the slider 54 from moving toward an interior of the dicing device 10 during the dicing processing. Alternatively, as the fixture 560, for example, various fixtures such as a magnetic fixture and a removable clamp pin may be applicable. Furthermore, the present embodiment may include a fixture for removably fixing the slider 54 moved to the retracted position P2 during the maintenance work.

Here, regarding the end face 52*a* located below the slider 54 in the Z-axis direction, it is desirable to determine a position of the end face 52*a* of the housing 52 in the X-axis direction so as to correspond to the position P2 of the slider 54 during the maintenance work.

Specifically, preferably the position of the end face 52*a* of the housing 52 in the X-axis direction is about the same as the retracted position P2 of the slider 54 during the maintenance work or is on an inner side of the dicing device 10 than the retracted position P2. When the slider 54 is moved to the retracted position P2 during the maintenance work, a position of worker's feet may correspond to the retracted position P2 so that workability may be further improved.

Figure 7:
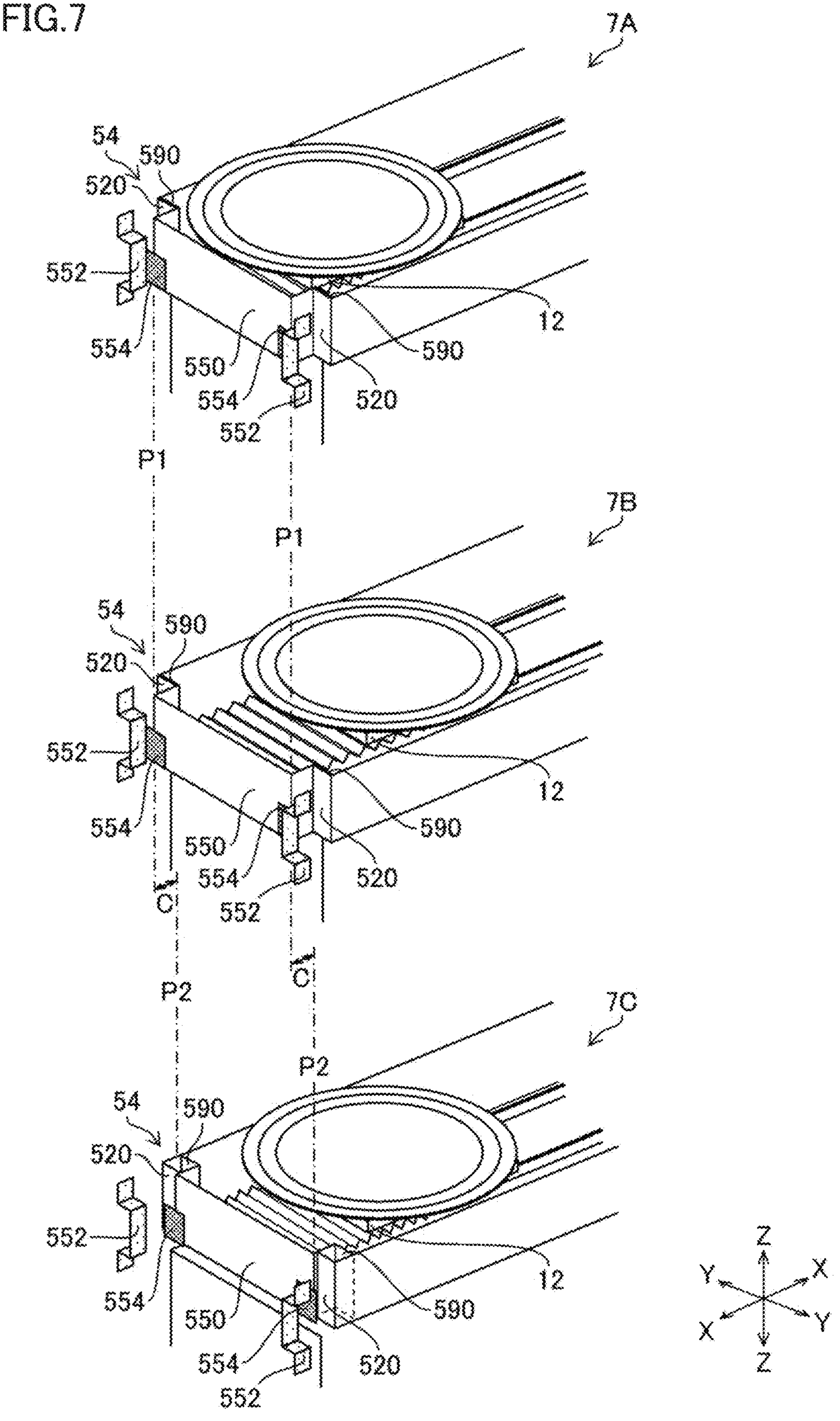
FIG. 7 is a view for explaining movement of the slider in an X-axis direction.

Subsequently, the movement of the slider 54 in the X-axis direction will be described in more detail with reference to FIG. 7. In FIG. 7, sign 7A designates a state in which the slider 54 is at the protruding position P1 during the dicing processing, and sign 7C designates a state in which the slider 54 is at the retracted position P2 during the maintenance work. Sign 7B designates a state of transitioning from the state of the sign 7A to the state of the sign 7B.

During the dicing processing, to acquire the stroke of the worktable feeding mechanism 16 (movable range of the worktable 12), the slider 54 is at the protruding position P1 where the slider 54 is protruding toward the maintenance area side, as designated by the sign 7A. In this case, the fixing side member 552 is engaged with the fixed side member 554 in each fixture 560 so as to fix the slider 54 to the housing 52, thereby preventing sliding movement of the slider 54.

When performing a maintenance work, as designated by the sign 7B, first the worktable 12 is stopped at the position (intermediate position) before the stroke end of the worktable feeding mechanism 16. Subsequently, as designated by the sign 7C, the engagement between the fixing side member 552 and the fixed side member 554 in each fixture 560 is released so that the slider 54 may slidingly move in the X-axis direction, and the slider 54 is pushed toward an interior of the housing 52 and moved (slid) to the retracted position P2. As a result, the slider 54 moves to be at the retracted position P2.

As a result, during the maintenance work, the access distance to the blade 14 decreases by an amount of the slidable distance C between the protruding position P1 and the retracted position P2 in the slider 54, so that accessibility to the blade 14 is improved, and the replacement work of the blade 14 may be efficiently performed.

Advantageous Effects of Invention

As described above, in the dicing device 10 according to the present embodiment, during a maintenance work, a slider 54 constituting a part of the end face 52*a* of the housing 52 may be pushed in more than during dicing processing. Therefore, when performing the maintenance work, accessibility from a maintenance area side (side on which the end face 52*a* of the housing 52 is formed) to a blade 14 is improved, and efficiency of a replacement work of the blade 14 may be improved.

As above, the embodiment of the present invention has been described, but the present invention is not limited to the above examples, and various improvements and modifications may be made without departing from the gist of the present invention.

REFERENCE SIGNS LIST

10 . . . dicing device, 12 . . . worktable, 13 . . . frame, 14 . . . blade, 16 . . . worktable feeding mechanism, 17 . . . X-axis guide rail, 18 . . . spindle, 26 . . . waterproof cover, 28 . . . Y-axis table, 29 . . . Y-axis guide rail, 30 . . . Z-axis table, 34 . . . imaging means, 52 . . . housing, 52*a* . . . end face, 54 . . . slider, 72 . . . operation unit, 74 . . . monitor, 520 . . . stopper surface, 540 . . . guide rail block, 550 . . . front plate part, 552 . . . fixing side member, 554 . . . fixed side member, 555 . . . side plate part, 560 . . . fixture, 570 . . . bottom plate part, 580 . . . guide rail, 590 . . . retaining plate part, W . . . workpiece, M . . . maintenance space

What is claimed is:

1. A dicing device comprising a housing configured to accommodate inside thereof, a worktable configured to hold and move a workpiece, and a spindle configured to be rotatable while holding a blade, wherein the housing comprises:

an end face provided in a moving direction of the worktable, the end face being on a side where a maintenance work of the dicing device is performed; and a slider constituting a part of the end face, and the slider is configured to be freely slidable in a direction to shorten a distance from the end face to the spindle.

2. The dicing device according to claim 1, wherein the slider is located at a protruding position during dicing processing and is located at a retracted position that is a position closer to the blade than the protruding position during the maintenance work.

3. The dicing device according to claim 2, further comprising:

a fixture configured to removably fix the slider at the protruding position.

* * * * *